(12) United States Patent
Li (10) Patent No.: US 6,597,707 B1
(45) Date of Patent: Jul. 22, 2003

(54) CIRCUITRY, ARCHITECTURE AND METHODS FOR SYNCHRONIZING DATA

(75) Inventor: Gabriel Li, San Francisco, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/391,967

(22) Filed: Sep. 8, 1999

(51) Int. Cl.[7] .............................. H04L 25/36; H04L 7/00
(52) U.S. Cl. ...................... 370/503; 375/372; 710/61
(58) Field of Search ................................. 370/298, 351, 370/412, 498, 503, 506, 509, 516, 350, 413, 414, 415; 375/354, 355, 371, 372; 710/1, 56, 58, 61, 71, 74

(56) References Cited

U.S. PATENT DOCUMENTS

| | | | | |
|---|---|---|---|---|
| 4,667,324 A | | 5/1987 | Graves | 370/102 |
| 4,893,306 A | | 1/1990 | Chao et al. | 370/94.2 |
| 4,945,548 A | * | 7/1990 | Iannarone et al. | 375/214 |
| 4,984,251 A | | 1/1991 | Perloff et al. | 375/38 |
| 5,046,182 A | * | 9/1991 | Hamstra et al. | 370/452 |
| 5,063,575 A | | 11/1991 | Annamalai | 375/108 |
| 5,068,880 A | | 11/1991 | Kline et al. | 375/116 |
| 5,179,664 A | * | 1/1993 | Li et al. | 710/61 |
| 5,185,863 A | | 2/1993 | Hamstra et al. | 395/250 |
| 5,293,409 A | | 3/1994 | Doornenbal et al. | 375/106 |
| 5,323,426 A | | 6/1994 | James et al. | 375/118 |
| 5,648,776 A | | 7/1997 | Widmer | 341/100 |
| 5,923,667 A | | 7/1999 | Poiraud et al. | 370/515 |
| 6,512,804 B1 | * | 1/2003 | Johnson et al. | 375/372 |

OTHER PUBLICATIONS

Cypress. HotLink Transmitter/Receiver. Aug. 14, 1997.*
Gabriel Li, "Circuitry, Architecture and Method(s) for Synchronizing Data", U.S. Ser. No. 09/391,865, filed Sep. 8, 1999.
Gabriel Li, "Circuitry, Architecture and Method(s) for Synchronizing Data", U.S. Ser. No. 09/392,042, filed Sep. 8, 1999.

* cited by examiner

*Primary Examiner*—Melvin Marcelo
*Assistant Examiner*—Derrick W. Ferris
(74) *Attorney, Agent, or Firm*—Christopher P. Maiorana, P.C.

(57) ABSTRACT

An apparatus comprising a first programmable circuit configured to present (i) a first parallel data signal and (ii) a first control signal in response to one or more serial data signals and a second programmable circuit configured to generate a second parallel data signal in response to (i) the first parallel data signal, (ii) the first control signal and (iii) a second control signal.

20 Claims, 8 Drawing Sheets

CIRCUITRY, ARCHITECTURE AND METHODS FOR SYNCHRONIZING DATA

CROSS REFERENCE TO RELATED APPLICATIONS

The present application may relate to co-pending application Ser. Nos. 09/391,865 and 09/392,042, each filed Sep. 8, 1999.

FIELD OF THE INVENTION

The present invention relates to data communication devices generally and, more particularly, to circuitry, architecture and method(s) for synchronizing data.

BACKGROUND OF THE INVENTION

Conventional data communication devices use a word synchronization event to synchronize the data received. The synchronization event precedes the receipt of the data. The event is the transmission of 16 consecutive special characters, such as K28.5 characters. An elasticity buffer (EB) is reset and data from each channel is synchronized. The skew allowed between the channels must meet a predetermined tolerance, such as +/−2 bit times.

When synchronizing multiple channels across chips, a master channel must be arbitrarily selected whose Word Sync Output (WSO) signal is connected to all other Word Sync Inputs (WSI). The WSO is a three bit serial protocol informing the other chips to add or delete idle characters. Because of the limitation of the EB, the maximum skew allowed among channels is still +/−2 bit times. However, the skew allowed among the channels within the chip is larger than +/−2 bit time.

SUMMARY OF THE INVENTION

One aspect of the present invention concerns an apparatus comprising a first programmable circuit configured to present (i) a first parallel data signal and (ii) a first control signal in response to one or more serial data signals and a second programmable circuit configured to generate a second parallel data signal in response to (i) the first parallel data signal, (ii) the first control signal and (iii) a second control signal.

Another aspect of the present invention concerns a circuit comprising a storage circuit configured to read and write data one or more addresses in response to one or more first decoded control signals and a decoder circuit configured to present an output data signal in response to (i) the one or more addresses, (ii) a fixed address and (iii) one or more second decoded control signals.

The objects, features and advantages of the present invention include providing a communications device that may (i) use a common crystal, (ii) align parallel frequencies to reduce or eliminate skew between channels, (iii) operate in a system where a number of PLLs are locked, and/or (iv) operate to deskew parallel frequencies in a configuration where data is stripped and parallel decoding is normally lost.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may provide circuitry, architecture and method(s) for synchronizing data received from multiple channels within or across a chip boundary. A transmitting station may synchronously strobe out byte-wide data on each channel. A device generally serializes the byte-wide data into a serial bitstream. The present invention may operate in applications that require a number of channels (e.g., 2 or more channels, or more than 4 channels). The present invention may use one common clock for strobing the byte-wide data and for timing the PLL synthesizers of all channels. The skew at the serial bitstream within the chip boundary is effectively reduced to zero. The same skew at the chip boundary may be as large as one half of a byte clock. The PLL divider is not generally required to be synchronized across the chip boundary. The biggest skew between the multiple channels generally occurs as data is transmitted across a medium, like a backplane or copper cable network. At the receiving station, the serial data from each channel may be framed to a particular character boundary and written into an elasticity buffer (EB). A read mechanism in the buffer may absorb the skew between the channels and generally may align the byte-wide data to compensate for skew between the channel outputs.

Figure 1:
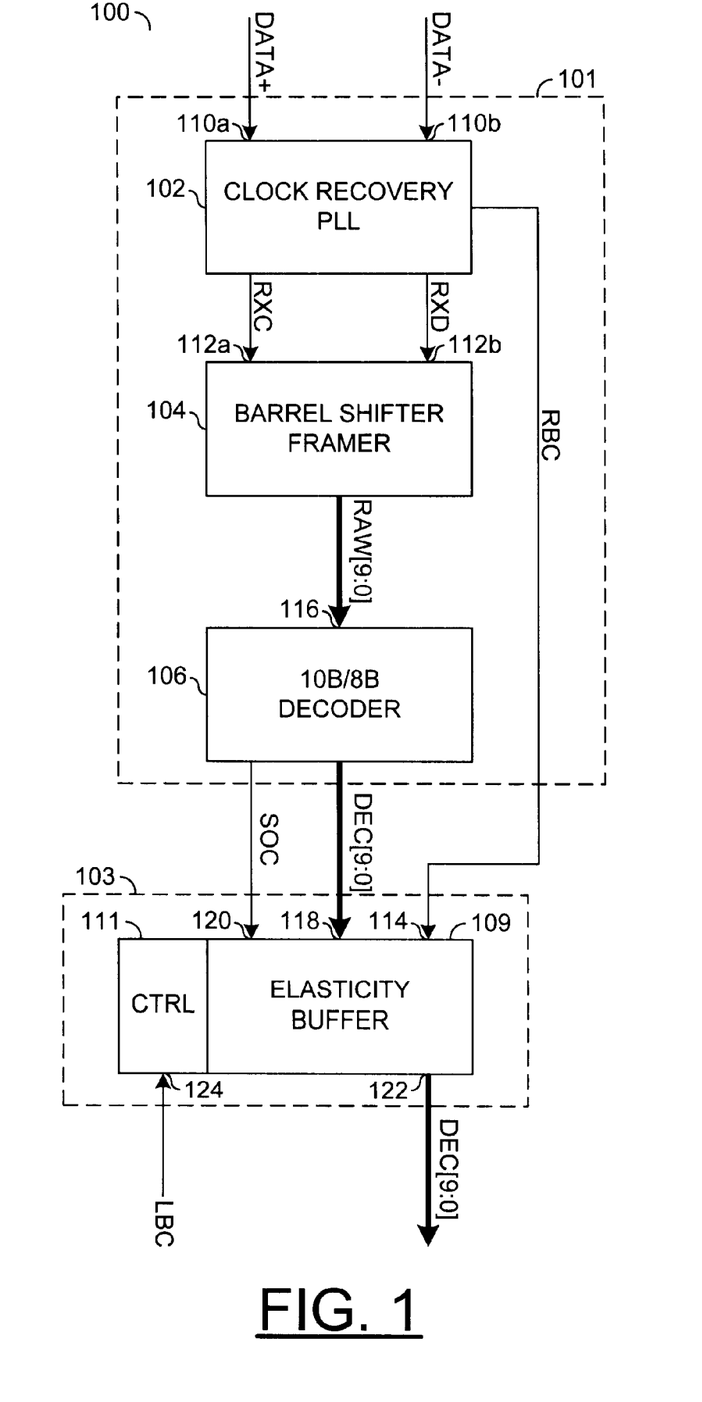
FIG. 1 is a block diagram of a receiver in accordance with a preferred embodiment of the present invention.

Referring to FIG. 1, a block diagram of a circuit 100 is shown in accordance with a preferred embodiment of the present invention. In one example, the circuit 100 may be a receive circuit. The circuit 100 generally comprises a first circuit 101 and a buffer portion (or circuit) 103. The first circuit 101 generally comprises a clock recovery PLL 102, a barrel shifter framer 104, and a decoder 106. The buffer portion 103 may comprise an elasticity buffer (e.g., EB) 109 and a control circuit 111. In one example, the control circuit 111 may be a programmable buffer control circuit. The clock recovery PLL 102 may have an input 110i aand an input 110b that may receive data (e.g., a serial data signal DATA+ and a serial data signal DATA−). The clock recovery PLL 102 may present a signal (e.g., RXC) to an input 112a of the barrel shifter framer 104, a signal (e.g., RXD) to an input 112b of the barrel shifter framer 104 and a clock signal (e.g., RBC) to an input 114 of the elasticity buffer 109. The barrel shifter framer 104 may present a multi-bit signal (e.g., RAW[9:0]) to an input 116 of the decoder 106. The decoder 106 may present a multi-bit signal DEC[9:0] to an input 118 of the elasticity buffer 109. The decoder 106 may also present a signal (e.g., SOC) to an input 120 of the elasticity buffer 109. The elasticity buffer 109 may present a modified version of the signal DEC[9:0] at an output 122. The control circuit 111 may also receive a clock signal (e.g., LBC) at an input 124.

The clock recovery PLL 102 generally recovers clock information from the serial data streams DATA+ and DATA− received at the inputs 110a and 110b. The synchronized data is generally clocked into the barrel shifter framer 104. In one example, the barrel shifter framer 104 may be implemented as a 10-bit barrel shifter. However, other bit-width barrel shifters may be implemented accordingly to meet the design criteria of a particular implementation. The barrel shifter 104 will generally execute a framing function on particular character (e.g., a K28.5 character) An example of the K28.5 character may be found on pages 23–31 of the 1999 Hotlink User's Guide, published by Cypress Semiconductor, the appropriate portions of which are incorporated by reference. The K28.5 character may be a special character code that is normally not used in data communication devices. Once the character boundary has been established by the K28.5 character, a 10-bit character is generally sent to the decoder 106. In one example, the decoder 106 may be implemented as a 10B-to-8B decoder. An example of the decoder 106 may be found in co-pending application Ser. No. 09/182,361, which is hereby incorporated by reference in its entirety. However, other 10B-to-8B decoders may be implemented accordingly to meet the design criteria of a particular implementation.

The decoded data, together with a control signal (e.g., RXSC/D or Receive Special Character/Data) and a control signal (e.g., RXRVS or Receive Violation Symbol—see the tables in the previously mentioned data book), may provide a total of 10 bits that may be written into the elasticity buffer 109 with the signal RBC received at the input 114. The signal RBC may be a recovered byte clock. The data from the elasticity buffer 109 may be read by the clock signal LBC. The clock signal LBC may be a local byte clock.

Figure 2:
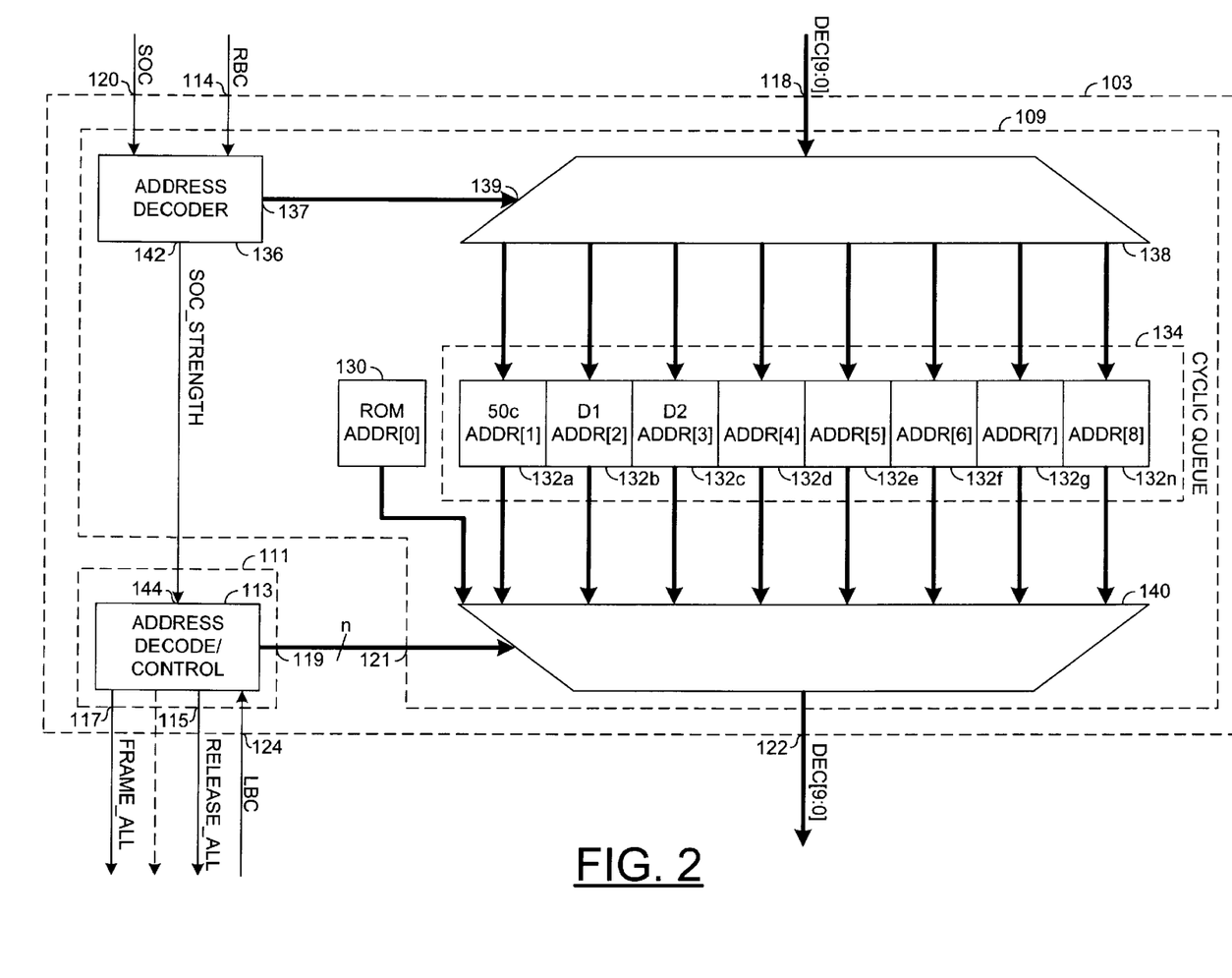
FIG. 2 is a block diagram of the buffer portion of FIG. 1.

Referring to FIG. 2, a mote detailed diagram of the buffer portion 103 is shown. The control circuit 111 may include an address decoder 113. In one example, the address decoder 113 may be implemented as an address decoded control circuit. The address decoder 113 may present a signal (e.g., RELEASE_ALL) at an output 115, a signal (e.g., FRAME_ALL) at an output 117, and one or more control signals at an output 119. The output 119 may be connected to an input 121 of the elasticity buffer 109 through a multi-bit bus.

The elasticity buffer 109 generally comprises a cell 130, a number of cells 132a–132n that comprise a storage section 134, an address decoder 136, a device 138 and a device 140. The address decoder 136 may connect to the device 138 from an output 137 to an output 139. The device 138 may write to the storage section 134 in response to the address decoder 136.

The cell 130 (e.g. addr[0]) may be implemented as a hard coded character. In one example, a K28.5 character may be hard coded into the cell 130. The cell 130 may be implemented as a read-only memory cell (ROM) or other non-volatile memory (e.g., flash, etc.) appropriate for the design criteria of a particular implementation. Additionally, other characters may be coded or loaded into the cell 130 in order to meet the design criteria of a particular implementation. The cell 130 is generally the only location of the elasticity buffer 109 that the read and write pointer address may overlap. The number of cells 132a–132n generally controls a number of bytes of clock skewing capability.

During a reset, the address decoder 113 may be presetting a K28.5 character until it receives a signal (e.g., SOC_STRETCH). The signal SOC_STRETCH may indicate a start of cell character. The data will generally be read from the memory cells 132a–132n as a cyclic queue. The SOC character may be written into a cell 132a (e.g., addr), and the subsequent data bytes are written into the cell 132b (e.g., addr), the cell 132c (e.g., addr), the cell 132d (e.g., addr), the cell 132e (e.g., addr), the cell 132f (e.g., addr), the cell 132g (e.g., addr), and the cell 132n (e.g., addr) and wraps around to addr. An example of the buffer portion 103 is illustrated having one hard coded cell 130 an eight cells 132a–132n that provide read and write pointer control. However, any number of cells may be implemented accordingly to meet the deign criteria of a particular implementation.

In the example of 8 cells, after writing 8 consecutive K28.5 characters, the write pointer generally returns to the cell 132a (e.g., addr) and stays there until it receives the signal SOC again. When the reader outputs the first K28.5 character which signals an end of cell (EOC) and increment a counter, it will normally continue to read 8 consecutive K28.5 characters and return to the cell 130 (e.g., addr). The buffer portion 103 generally stays at add and outputs K28.5 until it receives the signal SOC again. The address decoder 136 may present the signal SOC_STRETCH at an output 142 that may be received at an input 144 of the address decoder 113. The signal SOC_STRETCH is generally larger than a period of the signal RBC, to ensure that it will be sampled by an asynchronous clock, LBC. The signal SOC_STRETCH may be programmable to implement an appropriate pulse width at the output of the address decoder 142.

Figure 3:
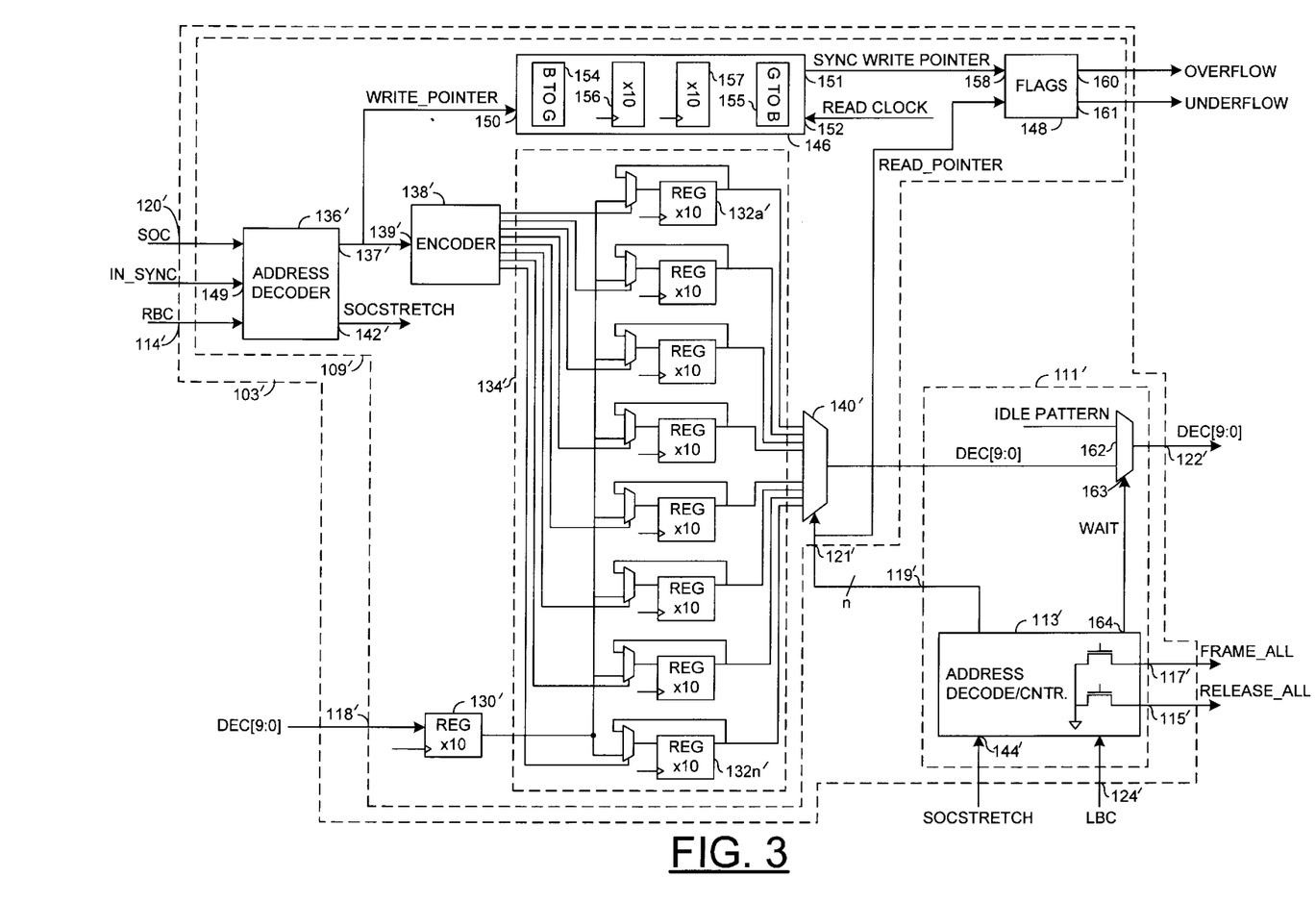
FIG. 3 is an alternate block diagram of the buffer portion of FIG. 1.

Referring to FIG. 3 an alternate buffer portion 103' is shown. The alternate buffer portion 103' may be implemented in place of the buffer portion 103 of FIG. 1. The buffer portion 103' may comprise similar components (characterized with prime notation) as the buffer portion 103. The elasticity buffer 109' may additionally comprise a synchronizer block (or circuit) 146 and a flag block (or circuit) 148.

The address decoder 136' may present a signal (e.g., WRITE_POINTER) to the device 138' at the input 139' and to the synchronizer circuit 146 at an input 150. In one example, the device 138' may be implemented as an encoder in order to meet the criteria of a particular implementation. The address decoder circuit 136' may present the signal WRITE_POINTER in response to the signal SOC received from the input 120', the signal RBC received from the input 114' and a signal (e.g., IN_SYNC) received at an input 149. The synchronizer circuit 146 may present a signal (e.g., SYNC_WRITE_PTR) at an output 151. The synchronizer 246 may present the signal SYNC_WRITE_PTR in response to the signal WRITE_POINTER and a signal (e.g., READ_CLOCK) received at an input 152. The synchronizer circuit 146 may synchronize the writing of data to the storage section 134'. The synchronizer circuit 146 may comprise a converter 154, a converter 155, a buffer 156 and a buffer 157.

The signal SYNC_WRITE_PTR may be presented to the flag circuit 146 at an input 158. The flag circuit 148 may receive one or more signals (e.g., READ_POINTER) from the input 121'. The flag circuit 147 may generate an overflow flag (e.g., OVERFLOW) at an output 160. The flag circuit 147 may generate an underflow flag (e.g., UNDERFLOW) at an output 161. The flags may be generated in response to the signal SYNC_WRITE_PTR and the signal READ_POINTER.

The control circuit 111 may comprise an additional multiplexer 162. The multiplexer 162 may receive the signal DEC[9:0] and a signal (e.g., IDLE_PATTERN). The multiplexer 162 may receive a control signal (e.g., WAIT) at an input 163. The multiplexer 162 may present the modified signal DEC[9:0] in response to the signal DEC[9:0], the signal IDLE_PATTERN and the signal WAIT. The signal WAIT may be presented by the address decoder circuit 113' at an output 164.

The write control signals SOCSTRETCH, IN_SYNC and SOC and the read control signal READ_CLOCK all may be implemented as 160 Mhz clock signals. However, the write control signals SOCSTRETCH, IN_SYNC and SOC may vary by one of two parameters. The first parameter may be a skew parameter. The skew parameter may delay the start at a write clock signal in steps of bit time. The second parameter may be a fstep parameter. The fstep parameter may increase or decrease the frequencies of the write clock signals in steps of 10 ppm (0.000625 hs). Writing data is generally a sequence that may be clocked by the write clock signals SOCSTRETCH, IN_SYNC and SOC. The signal SOC may be generated every time the count reaches 100.

Figure 4:
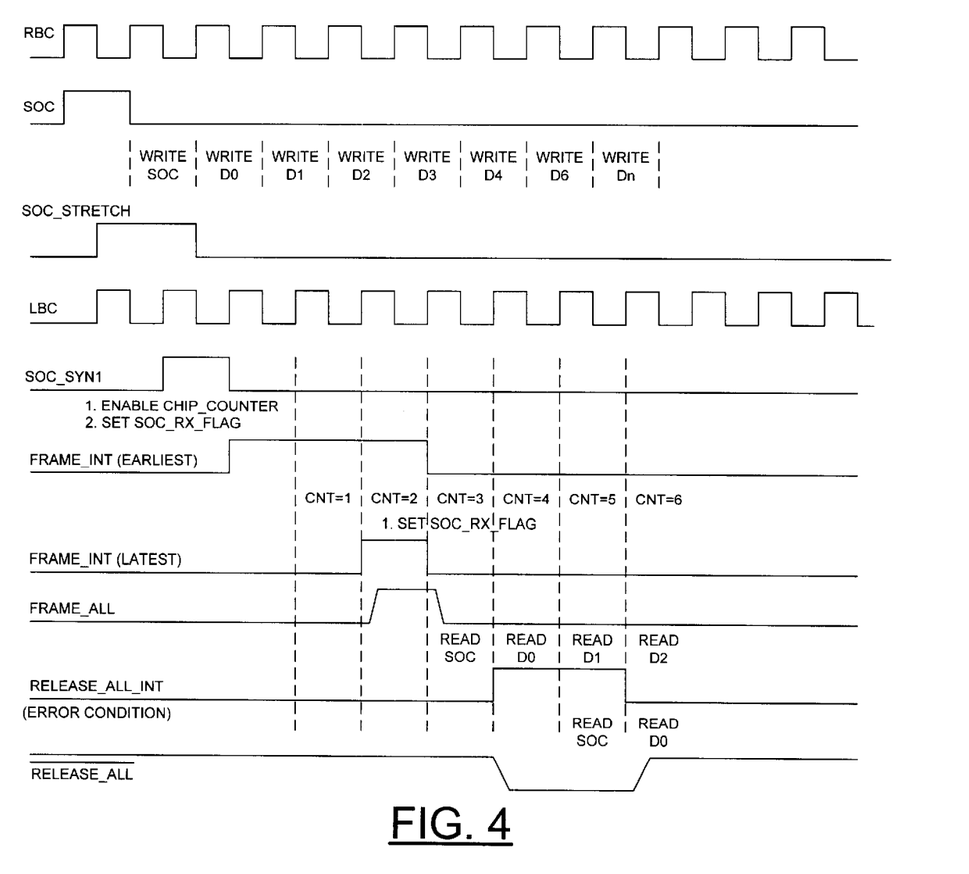
FIG. 4 is a timing diagram of the various waveforms of the present invention.

FIG. 4 illustrates the operation of the control circuit 111 of the buffer portion 103. The write signals of the buffer portion 103 may be the 10-bits of decoded data DEC [9:0], the signal SOC, and the clock signal RBC received from the clock recovery PLL circuit 102. All of the signals used by the address decoder 136 are generally synchronized to the clock signal RBC. When the signal SOC is set and the rising edge of the clock signal RBC, the signal SOC may be written into cell addr[1]. The data values (e.g., D[0] to D[n]) may be written sequentially into addr[2], addr[3], addr[4], addr[5], addr[6], addr[7], addr[8], and wrapped around into addr[1], forming a continuous cyclic buffer queue. The signal SOC_STRETCH is generally the signal SOC stretched out by half the clock signal RBC and is generally passed to the reader (LBC) domain.

The signal SOC_STRETCH is generally sampled by the clock LBC, which is generally asynchronous with respect to the clock signal RBC. The signal SOC_STRETCH is stretched by half of the clock period of the clock signal RBC and may be sampled by at least one rising edge of the clock signal LBC. The output of the second synchro may assert the signal FRAME_INT (to be described in connection with FIG. 5) and may be reset by the detection of the signal FRAME_ALL. The earliest assertion of the signal FRAME_INT generally enables a signal CHIP_COUNTER which is a counter that may count from, for example, 0 to 6. The signal CHIP_COUNTER may be reset by chip reset and the falling edge of the signal FRAME_ALL. The assertion of the signal FRAME_ALL is generally seen by all channels within or across a multi-channel circuit (e.g., circuit 204 in FIG. 6). The signal FRAME_ALL is generally only asserted if all the channels have asserted the signals FRAME_INT. The assertion of the signals FRAME_INT generally turns off all open drain devices (to be described in more detail in connection with FIG. 10) and a 300 ohm resistor will pull it up to VDD level. Synchronous detection of the signal FRAME_INT by all the channels may cause the elasticity buffer 109 to output a signal SOC and the data stream simultaneously as they are written.

If the skew is larger than a predetermined specification (e.g., by 2 byte times or other selected value), the CHIP_COUNTER counts to 4 which sets the RELEASE_ALL_INT flag and clears it at count equals to 6. The flag RELEASE_ALL_INT will force the elasticity buffer(s) 109 of all the channels to an output SOC character (e.g., D[0] . . . , and D[n] in the similar fashion as they are being written). Upon the assertion of the flag RELEASE_ALL_INT, a user should examine the signal SOC_RX_FLAG of each channel. The channel missing the signal SOC_RX_FLAG generally signals the failure to receive a SOC character.

The present invention generally allows a communication device to handle multi-channel skew by (at least 2 bytes) and offers chip to chip de-skewing function.

The signal RELEASE_ALL generally forces the reading of the data all at once even if one or more channels have not received their SOC character. The signal FRAME_ALL and its controls cause the reading of the data all at once. The open drain architecture of the outputs (RELEASE_ALL and FRAME_ALL) provides the wired-AND feature. The error quantification detection and reporting mechanism are novel.

Figure 5:
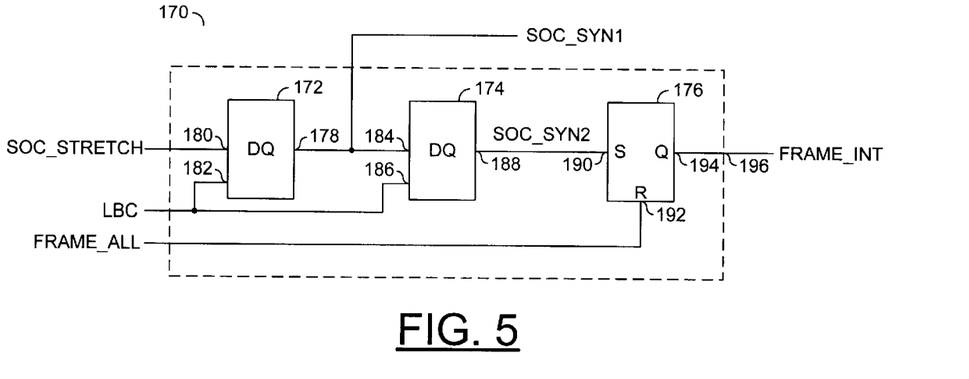
FIG. 5 is a diagram illustrating a circuit configured to generate one or more of the signals of FIG. 4.

Referring to FIG. 5, a diagram of a circuit 170 used to generate the signal FRAME_INT and the signal SOC_SYN1 is shown. The circuit 170 may generate the signal FRAME_INT in response to the signal SOC_STRETCH, the signal FRAME_ALL and the signal LBC. The circuit 170 generally comprises a first device 172, a second device 174 and a third device 176. In one example, the devices 172 and 174 may be implemented as D type flip-flops and the device 176 may be implemented as an SR latch. The signal SOC_SYN1 may be generated by the first device 172 at an output 178 in response to the signal SOC_STRETCH received at an input 180 and the signal LBC received at an input 182. The first device 172 may generate the signal SOC_SYN1 by sampling the signals SOC_STRETCH and LBC.

The signal SOC SYN1 may be presented to the second device 174 at an input 184. The second device 174 may receive the signal LBC at an input 186. The second device may generate the signal SOC_SYN2 at an output 188 in response to the signal SOC_SYN1 and the signal LBC. The signal device 174 may generate the signal SOC_SYN2 by sampling the signals SOC_SYN1 and LBC. The signal SOC_SYN2 may be presented to an input 190 of the third device 176.

The third device 176 may receive the signal FRAME_ALL at an input 192 and the signal SOC_SYN2 at the input 190. The third device 176 may generate the signal FRAME_INT at an output 194 in response to the signal SOC_SYN2 and the signal FRAME_ALL. The signal SOC_SYN2 may assert the signal FRAME_INT. The signal FRAME_ALL may de-assert the signal FRAME_INT. The signal FRAME_INT may be presented to an output 196 of circuit 170.

Figure 6:
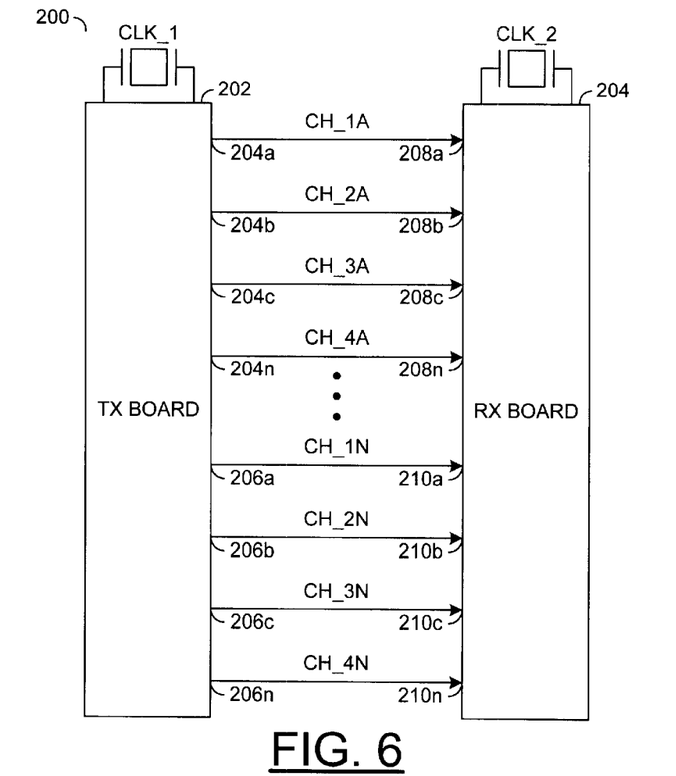
FIG. 6 is a block diagram illustrating a context for the present invention.

Referring to FIG. 6, an example of a circuit 200 illustrating the context of the present invention as shown. The circuit 200 generally comprises a transmit circuit 202 and a receive circuit 204. The transmit circuit 202 may respond to a first oscillator (e.g., CLK1). The receive circuit 204 may respond to a second oscillator (e.g., CLK2). The transmit circuit 202 generally presents a signal CH_1A at an output 204A, a signal CH_2A at an output 204B, a signal CH_3A at an output 204C and a signal CH_4A at an output 204N. Similarly, a signal CH_1N may be presented at an output 206A, a signal CH_2N may be presented at an output 206B, a signal CH_3N may be presented at an output 206C and a signal CH_4N may be presented at an output 206N. The signals CH_1A, CH_2A, CH_3A, CH_4A may be received at the inputs 208A–208N of the receive circuit 204, respectively. Similarly, the signals $CH_{13}1N$, CH_2N, CH_3N and CH_4N may be received by the inputs 210A–210N of the receive circuit 204, respectively.

Figure 7:
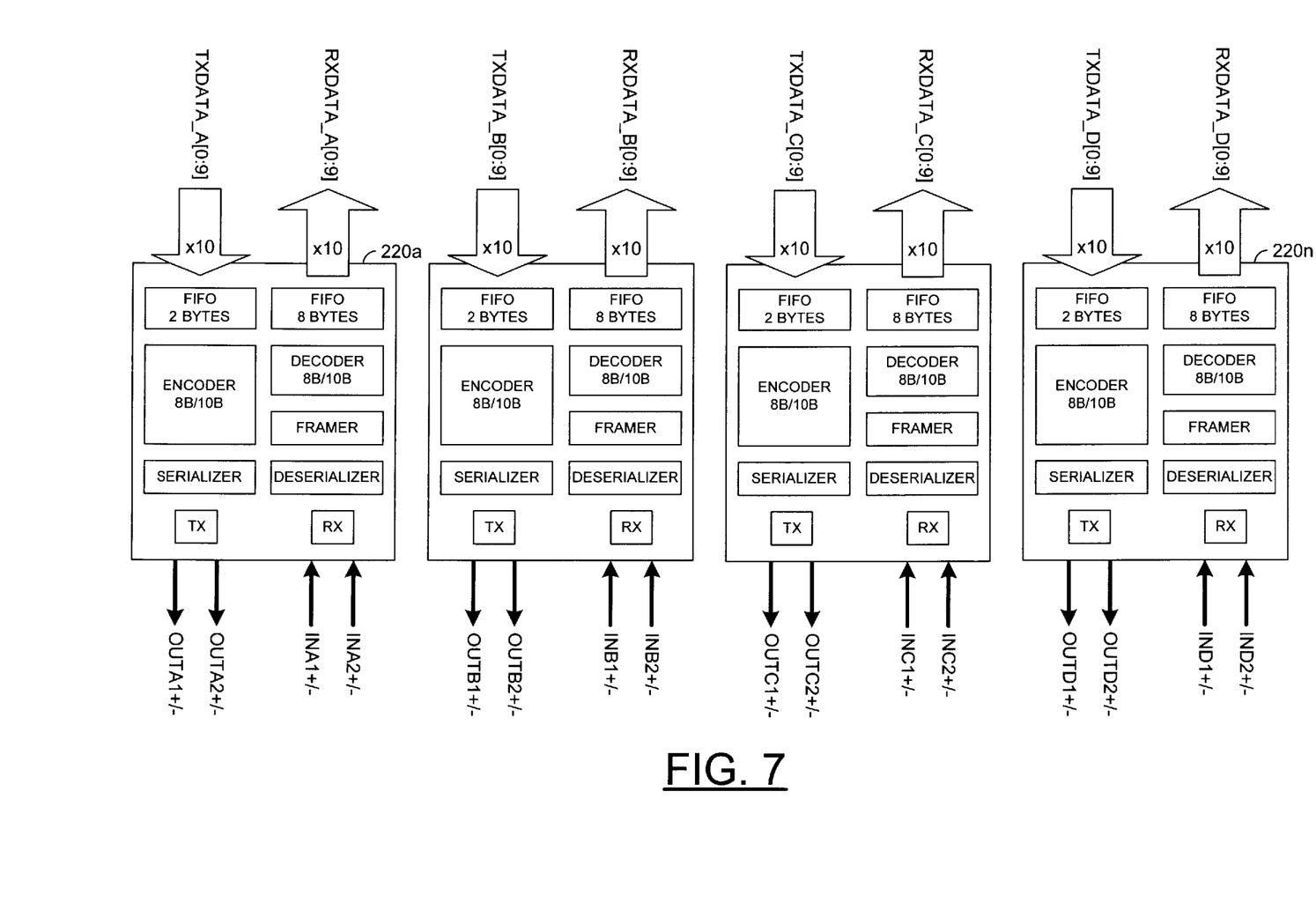
FIG. 7 is a more detailed block diagram of the circuit of FIG. 4.

Referring to FIG. 7, a more detailed diagram of the circuit of FIG. 6 is shown. Specifically, the circuitry between the outputs 204A–204N and the inputs 208A–208N is shown. For example, a number of circuits 220A–220N are shown.

Figure 8:
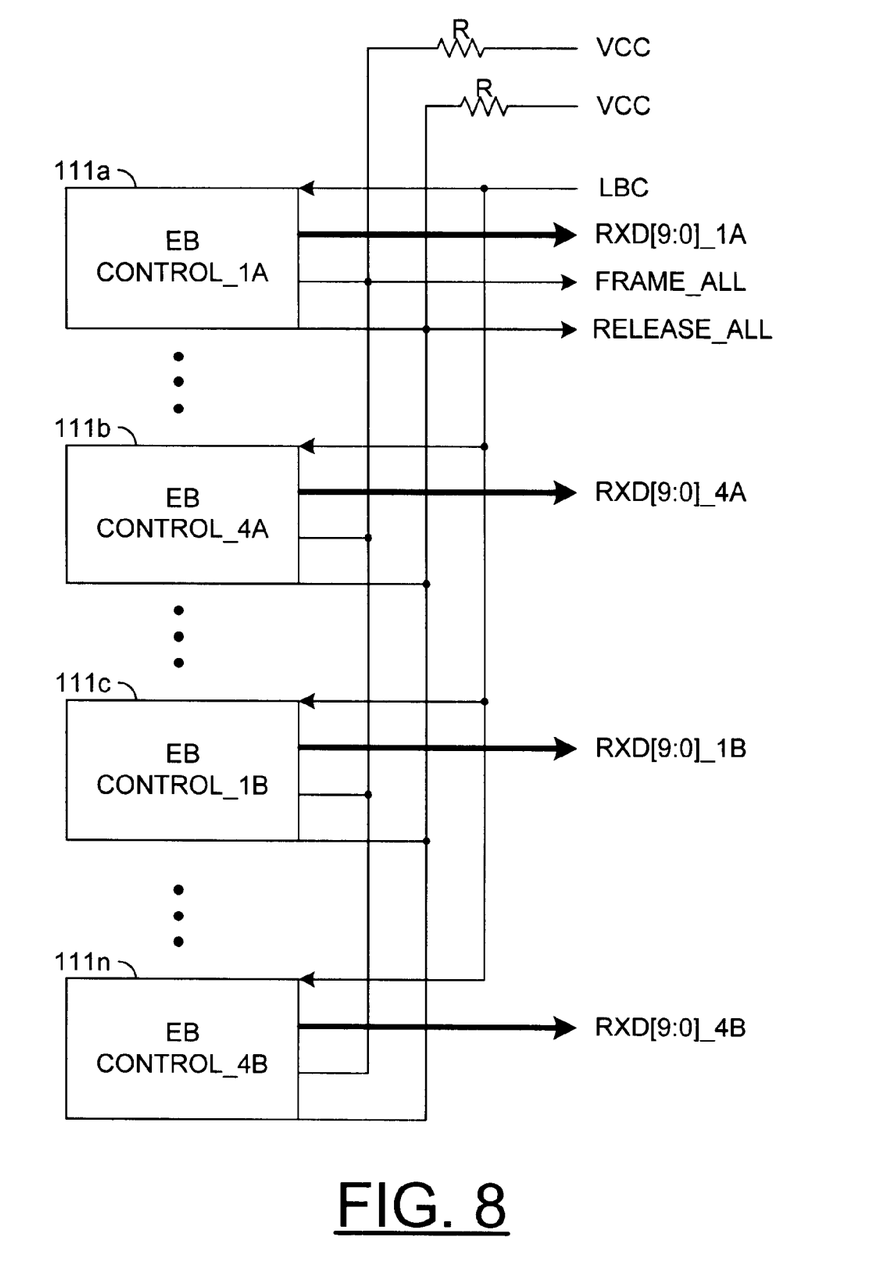
FIG. 8 is a diagram illustrating a number of elasticity buffer control circuits.

Referring to FIG. 8, an example of a number of elasticity buffers 111a–111n are shown. Each of the elasticity buffers 111a–111n generally receive the signal LBC. Each of the elasticity buffers generally present the signal RXD[9:0]_1A ... RXD[9:0]_4B.

Figure 9A:
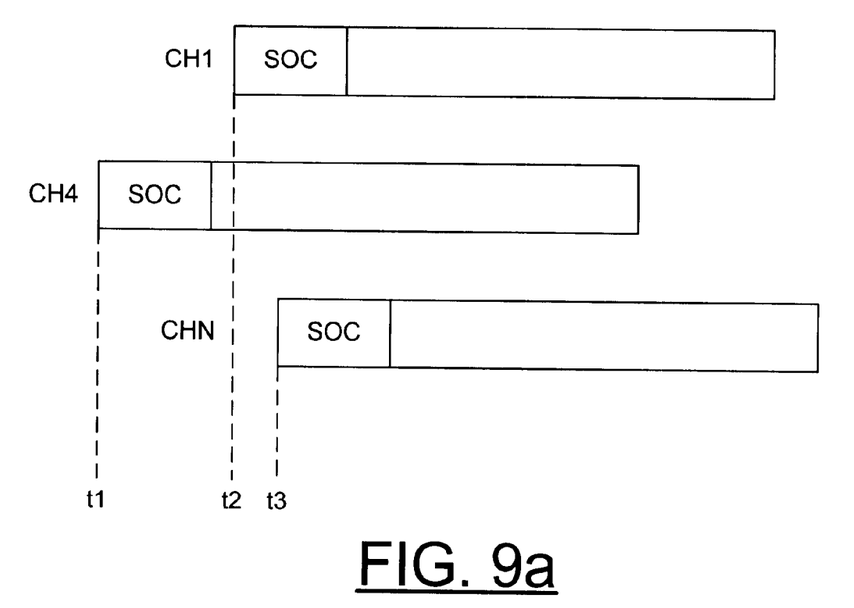
FIGS. 9A and 9B are diagrams illustrating packet alignment before and after the implementation of the present invention.
Figure 9B:
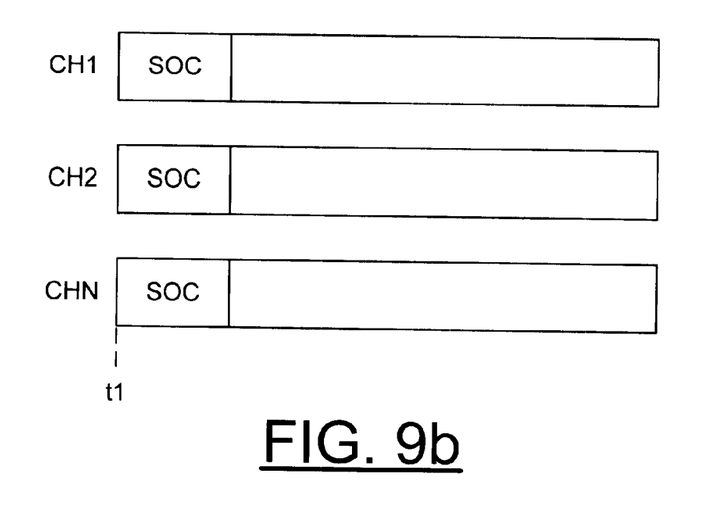

Referring to FIG. 9A, an illustration of the packet alignment without the deskewing circuitry is shown. For example, the start of character signals (SOC) for channels 1–N that are shown having a different starting time. For example, channel 4 shows a start of character signal (SOC) starting at a time t1. Channel 1 illustrates a start of character signal (SOC) starting a time t2. The channel N is shown having a start of character signal (SOC) beginning at a time t3. As a result, the time between the various start of character symbols SOC, results in undesirable skew. Specifically, the skew between the time t1 and the time t2 (e.g., between the SOC of channel 1 and the SOC of channel 2) represents one skew. The time between the channel 1 and the channel 10 may be another skew. The various skews are undesirable in a data communication device. FIG. 9B illustrates a starting time of the channels CH1–CHN, each starting at a time t1. Since each of the channels CH1–CHN start at the time t1, the skew between the channels is eliminated or reduced.

Figure 10:
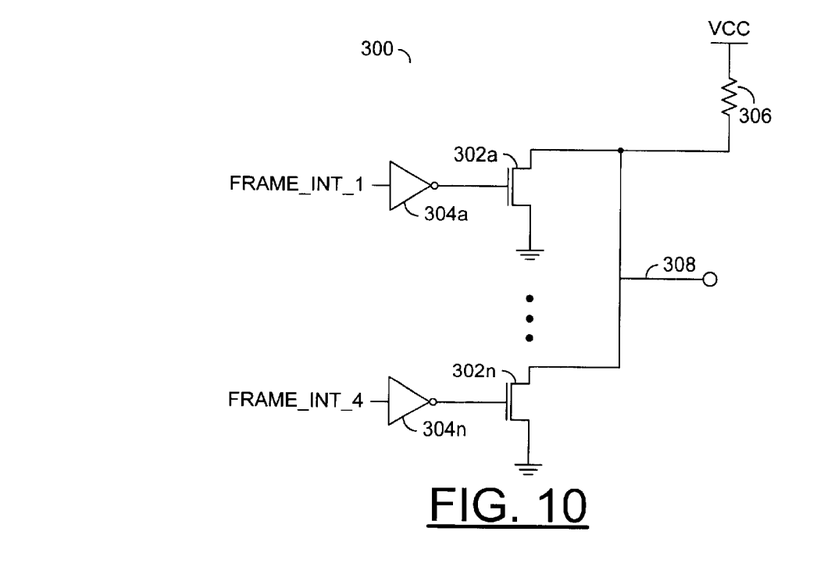
FIG. 10 is a diagram illustrating an example of the decode control circuit of FIG. 2.

Referring to FIG. 10, a circuit 300 is shown implementing a wired "AND". A number of devices 302a–302n may receive one of the signals FRAME_INT_1–4. For example, the signal FRAME_INT_1 may be presented to the device 302a, through an inverter 304a. Similarly, the signal FRAME_INT_4 may be presented to the device 302n, through an inverter 304n. The drain of the devices 302a–302n may be connected to a supply voltage through a resistor 306. In one example, the resistor 306 may be implemented as a 100–300 ohm resistor. However, other resistor values may be implemented accordingly to meet the design criteria of a particular implementation. Additionally, the devices 302a–302n may be implemented, in one example, as NMOS transistors. However, other transistors, such as PMOS transistors may be implemented accordingly to meet the design criteria of a particular implementation. An output 308 may present one of the signals FRAME_INT 1–N to implement a wired AND operation.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:

a buffer circuit configured to (i) store data in response to a first clock signal, (ii) store a first predetermined character in response to receiving a first start signal and (iii) read said first predetermined character and said data in response to a control signal; and a control circuit configured to (i) enable a frame signal to have an asserted state in response to said first predetermined character being stored and (ii) generate said control signal with a fixed address until said frame signal achieves said asserted state.

2. The circuit according to claim 1, wherein said buffer circuit comprises:

a first address decoder circuit configured to generate a decoded signal in response to said first clock signal and said first start signal to control storing of said data.

3. The circuit according to claim 2, wherein said first address decoder is further configured to set said decoded signal to a first address among a plurality of a cyclic queue addresses for said buffer circuit in response to an assertion of said first start signal.

4. The circuit according to claim 2, wherein said first address decoder circuit is further configured to generate a second start signal having a period longer than one period of said first clock signal.

5. The circuit according to claim 2, wherein said control circuit further comprises:

a second address decoder circuit configured to generate said control signal in response to a second clock signal.

6. The circuit according to claim 5, wherein said second address decoder circuit is further configured to set said control signal to a first address among a plurality of a cyclic queue addresses for said buffer circuit in response to said frame circuit achieving said asserted state.

7. The circuit according to claim 6, wherein said second address decoder circuit is further configured to set said control signal to said first address in response to receiving a release signal in an asserted state.

8. The circuit according to claim 6, wherein said second address circuit is further configured to step said control signal through said cyclic addresses in response to said second clock signal.

9. The circuit according to claim 1, wherein said buffer circuit further comprises:

a memory configured to store a second predetermined character at said fixed address.

10. The circuit according to claim 9, wherein said memory comprises a loadable non-volatile memory.

11. The circuit according to claim 1, wherein said buffer circuit comprises:

a storage circuit configured to store said data;

a first circuit configured to control writing said data to said storage circuit; and a second circuit configured to read said data from said storage circuit.

12. The circuit according to claim 11, wherein said storage circuit comprises a plurality of memory elements addressed by said first circuit to receive said data.

13. The circuit according to claim 12, wherein said buffer circuit is further configured to buffer said data at least one cycle of said first clock signal prior to writing to said plurality of memory elements.

14. The circuit according to claim 11, wherein (i) said control circuit is further configured to multiplex a predetermined pattern and said data received from said second circuit to an output.

15. The circuit according to claim 11, wherein said control circuit is further configured to begin reading said data from said storage circuit in response to a release signal in an asserted state.

16. The circuit according to claim 15, wherein said control circuit is further configured to drive said release signal to said asserted state a predetermined delay after said first predetermined character is stored.

17. The circuit according to claim 1, wherein (i) said buffer circuit is further configured to generate a second start signal in response to said first start signal and (ii) said control circuit is further configured to generate a first synchronization signal by buffering said second start signal.

18. The circuit according to claim 17, wherein said control circuit is further configured to generate said flag signal in response to buffering said first synchronization signal.

19. A method for buffering data, comprising the steps of:

(A) storing said data in response to a first clock signal;

(B) storing a first predetermined character in response to receiving a first start signal;

(C) reading said first predetermined character and said data in response to a control signal;

(D) enabling a frame signal to have an asserted state in response to said first predetermined character being stored; and (E) generating said control signal with a fixed address until said frame signal achieves said asserted state.

20. A circuit comprising:

means for storing data in response to a first clock signal;

means for storing a first predetermined character in response to receiving a first start signal;

means for reading said first predetermined character and said data in response to a control signal;

means for enabling a frame signal to have an asserted state in response to said first predetermined character being stored; and means for generating said control signal with a fixed address until said frame signal achieves said asserted state.

* * * * *